US012066873B2

(12) United States Patent
Yu

(10) Patent No.: US 12,066,873 B2
(45) Date of Patent: Aug. 20, 2024

(54) DISPLAY PANEL

(71) Applicant: Lenovo (Beijing) Limited, Beijing (CN)

(72) Inventor: Hai Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/682,926

(22) Filed: Feb. 28, 2022

(65) Prior Publication Data

US 2023/0101970 A1    Mar. 30, 2023

(30) Foreign Application Priority Data

Sep. 30, 2021    (CN) .......................... 202111159346.2

(51) Int. Cl.
*H01Q 1/38*    (2006.01)
*G06F 1/16*    (2006.01)
*H01Q 1/22*    (2006.01)
*H01Q 1/42*    (2006.01)
*H01Q 9/04*    (2006.01)

(52) U.S. Cl.
CPC ......... *G06F 1/1698* (2013.01); *H01Q 1/2266* (2013.01); *H01Q 1/425* (2013.01)

(58) Field of Classification Search
CPC ............ H01Q 1/36; H01Q 1/38; H01Q 1/425; H01Q 1/2266; H01Q 1/22; G06F 1/1613; G06F 1/1698
See application file for complete search history.

(56) References Cited

U.S. PATENT DOCUMENTS

| 10,734,708 | B2 * | 8/2020 | Yong | H01Q 9/0407 |
| 11,139,555 | B2 * | 10/2021 | Choi | H01Q 9/0407 |
| 2019/0020114 | A1 * | 1/2019 | Paulotto | H01Q 9/40 |
| 2021/0200379 | A1 * | 7/2021 | Youk | G06F 3/0412 |
| 2022/0006204 | A1 * | 1/2022 | Zhao | H01Q 9/0414 |

FOREIGN PATENT DOCUMENTS

| CN | 210956975 U | * | 7/2020 | ............ G09F 9/00 |
| CN | 111710254 A | * | 9/2020 | ............ H01Q 1/36 |
| CN | 112968046 A |   | 6/2021 | |

* cited by examiner

*Primary Examiner* — Blane J Jackson
(74) *Attorney, Agent, or Firm* — ANOVA LAW GROUP, PLLC

(57) ABSTRACT

The present disclosure provides a display panel including a display layer and an antenna layer. The display layer includes pixel units arranged according to a first rule. The antenna layer is arranged on a light-exiting side of the display layer and includes multiple metal grid units that are uniformly arranged in the antenna layer according to a second rule. The antenna layer includes a first area and a second area. The metal grid units in the first area are in conduction with each other and are not in conduction to the metal grid units in other areas to form an antenna unit. The second area is a non-antenna area. The ratio of the total area of the first area and the second area to the area of the display layer is greater than 90%.

17 Claims, 6 Drawing Sheets

DISPLAY PANEL

CROSS REFERENCE TO RELATED APPLICATION

The present application claims priority to Chinese Patent Application No. 202111159346.2, filed on Sep. 30, 2021, the entire content of which is incorporated herein by reference.

TECHNICAL FIELD

The disclosure generally relates to the technical field of display panels, and in particular, to a display panel with an antenna unit.

BACKGROUND

The antenna of an electronic device is usually arranged inside the body of the electronic device. In order to ensure the receiving effect and radiation effect of the antenna, it is required to reserve a clearance space on the body. That is, a non-metallic space needs to be reserved at a position corresponding to the antenna on the body to avoid a metal casing from shielding electromagnetic waves. Therefore, the casing of the electronic device cannot adopt an all-metal structure. The metal casing must be slotted or provided with a gap to form a clearance space for the antenna. The slot or gap needs to be filled with insulating materials, resulting in the production process of the casing to complex and expensive. In addition, since the antenna is arranged in the body, a structure such as an antenna bracket needs to be arranged, which will occupy the internal space of the body. This is not conducive to realizing the thinning and lightweight of an electronic device.

SUMMARY

One aspect of the present disclosure provides a display panel. The display panel includes a display layer, and an antenna layer. The display layer includes pixel units arranged according to a first rule, the antenna layer is arranged on a light-exiting side of the display layer, the antenna layer includes a plurality of metal grid units, the plurality of metal grid units are evenly arranged in the antenna layer according to a second rule, and the antenna layer includes a first area and a second area. The metal grid units in the first area are in conduction with each other, and are not in conduction to the metal grid units in the second area, whereby forming antenna units. The second area is a non-antenna area, and a ratio of a total area of the first area and the second area over an area of the display layer is greater than 90%.

In the display panel of the present disclosure, the area of the antenna layer is the same as or close to the area of the display layer, and the metal grid units are evenly arranged in the entire antenna layer according to the second law, and the metal grid units can cover or basically cover the entire display layer. The metal grid units in the first area are in conduction with each other, and the metal grid units in the first area are not in conduction to the metal grid units in other areas, thereby forming antenna units. In this way, the metal grid units can be made invisible to the human eye within a specific viewing distance range, and the display effect of the display panel can be guaranteed to be consistent. Transparent antennas can be formed without affecting the display effect, so as to avoid occupying the internal space of the body of the electronic device. It is conducive to realizing the lightweight and thinness of the electronic device, to avoiding the influence of the metal casing on the antenna, and also to reducing the design and processing difficulty of the casing.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

The following drawings are merely examples for illustrative purposes according to various disclosed embodiments and are not intended to limit the scope of the present disclosure.

The above and other objects, features and advantages of exemplary embodiments of the present disclosure will become readily understood by reading the following detailed description with reference to the accompanying drawings. In the accompanying drawings, exemplary embodiments of the present disclosure are shown by way of example and are not intended to be limited. In the drawings, the same or corresponding reference numerals denote the same or corresponding parts.

Figure 1:
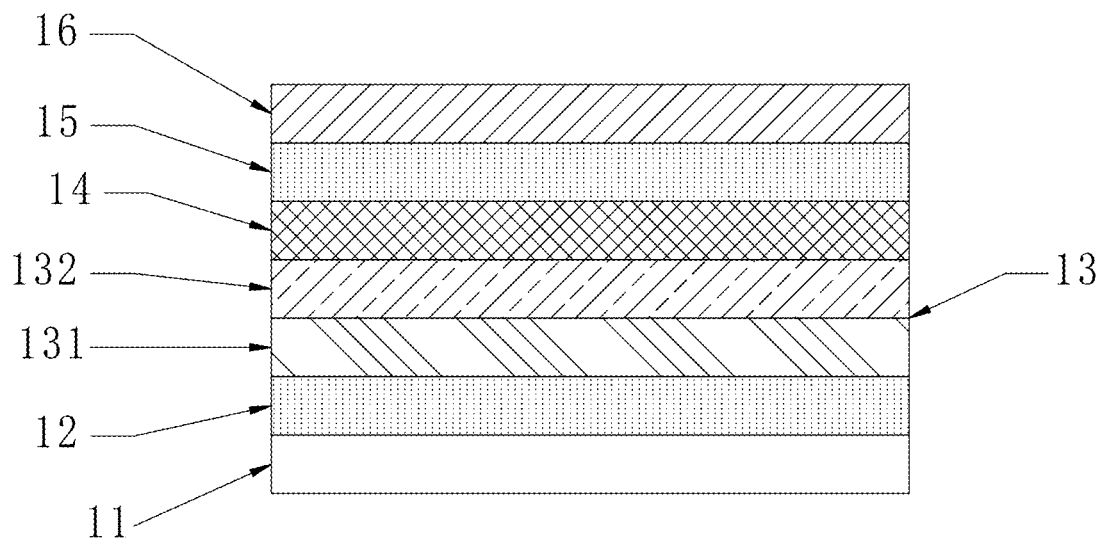
FIG. 1 illustrates a schematic diagram of a layered structure of a display panel according to an embodiment of the present disclosure.

Description of reference characters in the drawings is provided herein for reference: 11—display layer; 12—first adhesive layer; 13—antenna layer; 131—transparent carrier layer; 132—metal layer; 133—first area; 134—second area; 14—light polarizing layer; 15—second adhesive layer; 16—protective layer; 21—pixel unit; 22—metal grid unit; 23—first metal line; 24—second metal line; 30—antenna unit; 31—radiating body; 32—first feeding part; 33—second feeding part; and 34—reverse conduction circuit.

DETAILED DESCRIPTION

Reference will now be made in detail to exemplary embodiments of the disclosure, which are illustrated in the accompanying drawings. Wherever possible, the same reference numbers will be used throughout the drawings to refer to the same or similar parts.

Various aspects and features of the present disclosure are described herein with reference to the accompanying drawings.

It should be understood that various modifications may be made to the embodiments described herein. Therefore, the above description should not be regarded as limiting, but merely as exemplary embodiments. Those skilled in the art will envision other modifications within the scope and spirit of this disclosure.

The accompanying drawings, which are incorporated in and constitute a part of this specification, illustrate embodiments of the present disclosure and, together with the general description of the present disclosure given above and the detailed description of the embodiments given below, serve to explain the advantages and principles of the present disclosure.

These and other features of the present disclosure will become apparent from the following description of preferred forms of non-limiting embodiment, with reference to the accompanying drawings.

It is also to be understood that although the disclosure has been described with reference to some specific examples, those skilled in the art will be able to realize many other equivalents of the disclosure with certainty, which have the characteristics and features as claimed in the claims and are therefore within the scope of protection of the present disclosure.

The above and other aspects, features and advantages of the present disclosure will become more apparent in view of the following detailed description when taken in conjunction with the accompanying drawings.

Specific embodiments of the present disclosure are hereinafter described with reference to the accompanying drawings; however, it is to be understood that the claimed embodiments are merely examples of the present disclosure, which may be implemented in various ways. Well-known and/or repeated functions and structures are not described in detail to avoid obscuring the disclosure with unnecessary or redundant detail. Therefore, specific structural and functional details claimed herein are not intended to be limiting, but merely serve as a basis for the claims and a representative basis for teaching those skilled in the art to variously employ the present disclosure in substantially any suitable detailed structure.

This specification may use the phrases "in one embodiment," "in another embodiment," "in yet another embodiment," or "in other embodiments," which may all refer to one or more of the same or different embodiments in accordance with the present disclosure.

Figure 2:
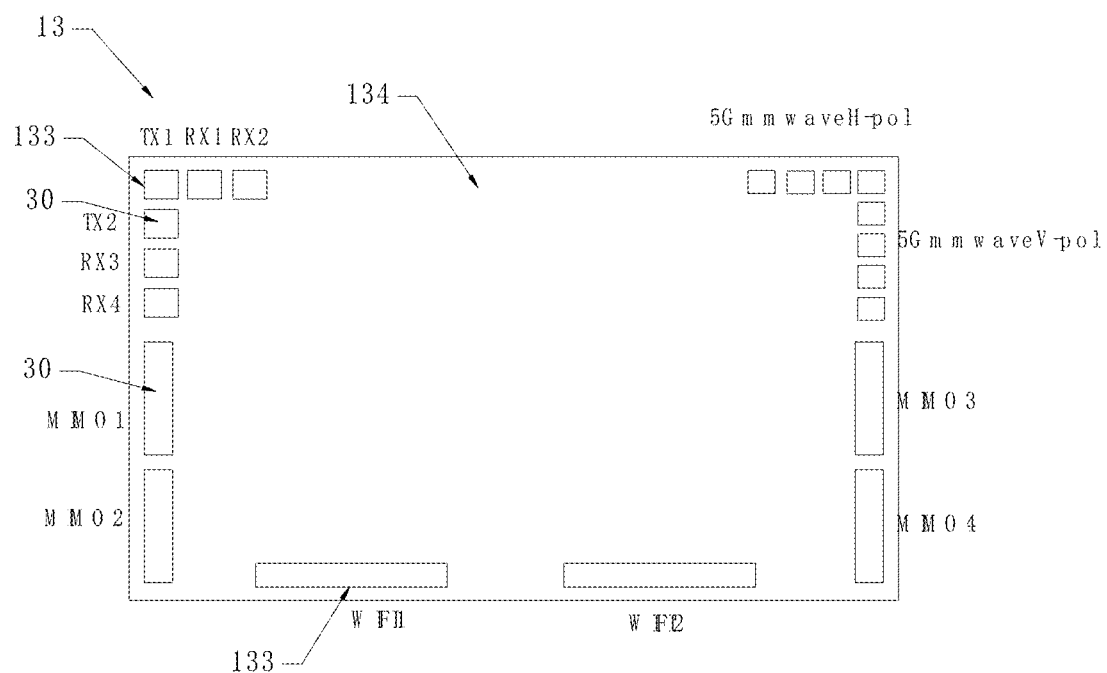
FIG. 2 illustrates a schematic structural diagram of an antenna layer of a display panel according to an embodiment of the present disclosure.
Figure 7A:
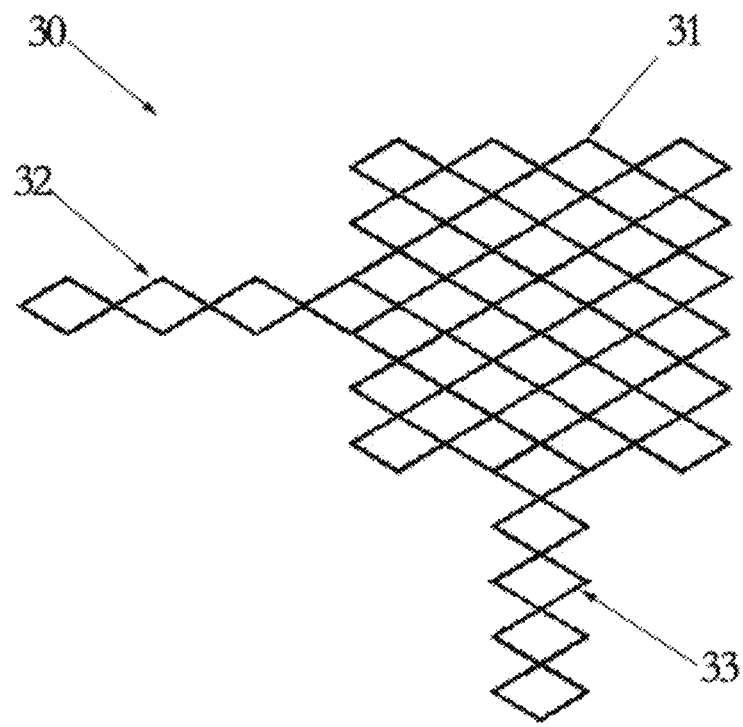
FIG. 7A illustrates a schematic structural diagram of an antenna unit according to an embodiment of the present disclosure.

Referring to FIG. 1, FIG. 2 and FIG. 7A, an embodiment of the present disclosure provides a display panel, which includes a display layer 11 and an antenna layer 13. The display layer 11 includes pixel units 21 arranged according to a first rule, and the antenna layer 13 is arranged on the light-exiting side of the display layer 11. The antenna layer 13 includes a plurality of metal grid units 22 (also referred to as metal mesh units 22), and the plurality of metal grid units 22 are evenly arranged in the antenna layer 13 according to a second rule. The antenna layer 13 includes a first area 133 and a second area 134. The metal grid units 22 in the first area 133 are connected to each other, and the metal grids in the first area 133 are not connected to the metal grid units 22 in other areas, so as to form an antenna unit 30. The second area 134 is a non-antenna area. The ratio of a total area of the first area 133 and the second area 134 over an area of the display layer 11 is greater than 90%.

With a display panel constructed with the above structure, the area of the antenna layer 13 is the same as or close to the area of the display layer 11, the metal grid units 22 are evenly arranged in the entire antenna layer 13 according to the second rule, and the metal grid units 22 can cover or substantially cover the entire display layer 11. The metal grid units 22 in the first area 133 are connected to each other, and the metal grid units 22 in the first area 133 are not connected to the metal grid units 22 in other areas, thus the antenna unit 30 is formed. In this way, the metal grid unit 22 can be invisible to the human eye within a specific viewing distance range, and the display effect of the display panel can be guaranteed to be consistent. A transparent antenna can be formed under the condition that the display effect is basically not affected, so as to avoid occupying the internal space of the body of the electronic device. This is conducive to the realization of a lightweight and thin electronic device, and avoids the influence of the metal casing on the antenna. This can also reduce the difficulties for designing and processing the casing of an electronic device.

As shown in FIG. 1, in some embodiments, the display panel may include a display layer 11, a first adhesive layer 12, an antenna layer 13, a light polarizing layer 14, a second adhesive layer 15 and a protective layer 16 that are stacked in sequence. That is, the antenna layer 13 can be adhere to the light-exiting side of the display layer 11 through the first adhesive layer 12, and the light polarizing layer 14 is provided on the side of the antenna layer 13 facing away from the display layer 11 for polarizing the light emitted from the display layer 11. The protective layer 16 is adhered to the side of the light polarizing layer 14 facing away from the antenna layer 13 through the second adhesive layer 15 to protect functional layers such as the light polarizing layer 14, the antenna layer 13 and the display layer 11, whereby avoiding these functional layers from being damaged. Optionally, the protective layer 16 may include, for example, a protective layer 16 formed of a glass cover plate or its material.

In some embodiments, the area of the antenna layer 13 may be the same as that of the display layer 11, and the overall shape of the antenna layer 13 may be the same as that of the display layer 11. For example, when the overall shape of the display panel is rectangular, both the display layer 11 and the antenna layer 13 can be rectangular and have the same dimensions. In this way, it can be ensured that the display effect of the entire display panel is consistent, and a difference in display effect caused by partial areas not covered by the antenna layer 13 can be avoided.

In some embodiments, the area of the antenna layer 13 is smaller than that of the display layer 11, and the ratio of the area of the antenna layer 13 over the area of the display layer 11 is greater than 90%. The antenna layer 13 is stacked over the middle of the display layer 11. That is, the area of the antenna layer 13 is smaller than that of the display layer 11, and the area of the antenna layer 13 is at least 90% of the area of the display layer 11. Which such construction, the antenna layer 13 can be stacked over the middle of the display layer 11, such that it can be ensured that most of the central area of the display layer 11 is covered by the antenna layer 13, and only a few edge areas are not covered by the antenna layer 13. Therefore, obvious differences in the display effect of the display panel can be prevented.

Figure 3:
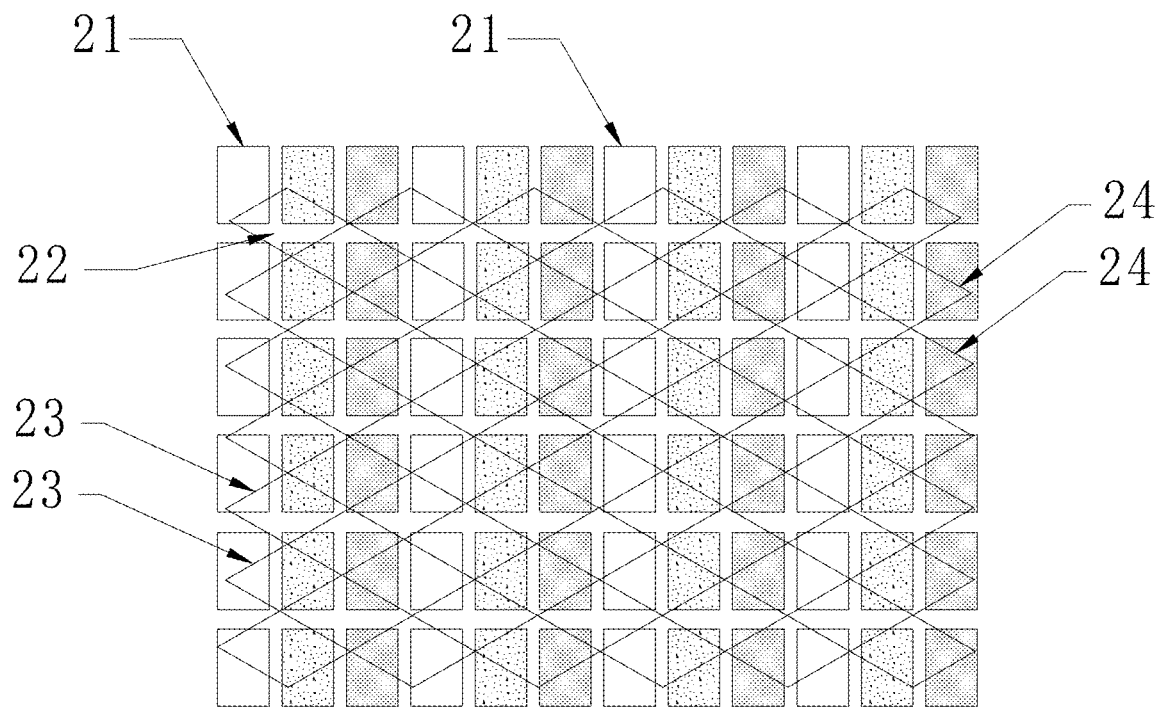
FIG. 3 illustrates a schematic partial structure diagram of a display panel according to an embodiment of the present disclosure.

As shown in FIG. 3, in some embodiments, the display layer 11 may include, for example, red pixel units (R), green pixel units (G) and blue pixel units (B). The red pixel units, green pixel units and blue pixel units are arranged according to the first rule.

Optionally, the red pixel unit, the green pixel unit and the blue pixel unit may have the same shape and size. For example, the red pixel unit, the green pixel unit and the blue pixel unit may all be rectangular and have the same size. The red pixel units, the green pixel units and the blue pixel units may be sequentially arranged at equal intervals in horizontal rows and vertical columns, and the red pixel units, the green pixel units and the blue pixel units are sequentially arranged in an alternate manner.

Optionally, the red pixel units, green pixel units and blue pixel units may have different shapes and sizes. One or more of the red pixel units, green pixel units and blue pixel units may be arranged in a pixel matrix according to a rule, and the pixel matrix is arranged according to another rule.

It can be understood that the pixel units 21 may be arranged in various manners or modes. The above embodiments are only examples, and are not intended to limit the structures and arrangements of the pixel units 21.

As shown in FIG. 1, in some embodiments, the antenna layer 13 may include a transparent carrier layer 131 and a metal layer 132 disposed on the transparent carrier layer 131. The metal layer 132 is formed by the metal grid unit 22. The metal grid unit 22 can be effectively carried through the transparent carrier layer 131. In a specific implementation, the metal grid unit 22 can be arranged on the surface of the transparent carrier layer 131 by processes such as deposition or coating. When processing the display panel, the transparent carrier layer 131 can be adhered by the first adhesive layer 12 to the light-exiting side of the display layer 11. This provides a feasible way to arrange the metal grid units 22 on the light-exiting side of the display layer 11, which can reduce the difficulty of production and processing. Optionally, the metal grid units 22 may be formed of a good conductor material such as copper, aluminum, silver or the like.

Alternatively, the transparent carrier layer 131 may be formed of, for example, polyethylene terephthalate (PET) film, COP film or polyimide (CPI) film. Apparently, the transparent carrier layer 131 can also be formed of other transparent films.

Optionally, the transmittance of the transparent carrier layer 131 may be greater than, for example, about 86%. The dielectric constant (Dk) of the transparent carrier layer 131 may be in the range of about 2 to about 4, and the loss tangent of the transparent carrier layer 131 may be less than about 0.1 to prevent the transparent carrier layer 131 from significantly affecting the display effect of the display panel.

In specific implementations, the metal grid units 22 may have various structures and arrangements. In an optional embodiment, the shape and size of the metal grid units 22 may be the same, and the metal grid units 22 with the same shape and size are arranged according to the second rule. In such way, the effects of the metal grid units 22 on the light projected by the display layer 11 are uniform or substantially uniform, so as to maintain a uniform or substantially uniform display effect in the entire display area.

For example, as shown in FIG. 3, the antenna layer 13 may include a first line group and a second line group. The first line group may include a plurality of mutually parallel first metal lines 23, and the second line group may include a plurality of mutually parallel second metal lines 24. The first metal lines 23 and the second metal lines 24 cross each other to form the metal grid units 22. That is, the metal grid units 22 may be formed by two sets of parallel lines intersecting with each other, so that the quadrilateral metal grid units 22 having the same shape can be formed. It should be noted that, in order to make the metal grid units 22 in the first area 133 not conduct with the metal grid units 22 in other areas, at least a part of the first metal lines 23 and the second metal lines 24 include multiple disconnected line segments. Optionally, the distances between the metal lines in each line group may be the same. In this way, the formed metal grid units 22 not only have the same shape but also the same size, which is beneficial to improve the consistency of the display effect.

It can be understood that the metal grid units 22 can also be formed by at least three groups of parallel lines that intersect with each other. The metal grid units 22 are not limited to being formed by intersecting straight lines, but also by intersecting curved lines, as long as the metal grid units 22 can be formed and arranged according to the second arrangement rule and the formed metal grid units 22 are not visible in a specific range of sight distance.

In another optional embodiment, the shapes and sizes of the metal grid units 22 may also be different. A plurality of metal grid units 22 with different shapes and/or sizes may first be arranged according to a rule to form matrix units, and the matrix units may then be arranged in the entire antenna layer 13 according to another rule. For example, a plurality of metal grid units 22 with different shapes and/or sizes may be arranged first to form approximately rectangular matrix units, and the rectangular matrix units may be arranged in the entire antenna layer 13 in horizontal rows and vertical columns. In this way, the entire display area of the display panel can also maintain a consistent or substantially consistent display effect.

In some embodiments, the metal grid unit 22 overlaps the pixel unit 21. The projection of the metal grid units 22 in the first direction divides the pixel unit 21 into a plurality of pixel areas, and the areas of the plurality of pixel areas are different. The first direction is a direction perpendicular to the plane where the display layer 11 is located. The metal grid unit 22 overlaps the pixel unit 21, that is, the projection of the metal grid unit 22 in the first direction at least partially overlaps the pixel unit 21. In this way, the light projected by the pixel unit 21 toward the light-exiting side will be divided by the metal grid unit 22. The pixel unit 21, which is originally a basic light-emitting unit, is divided and formed into a plurality of sub-pixel units 21. After the light emitted by the sub-pixel units 21 passes through the metal grid unit 22, the light would interfere to easily form interference fringes. The projection of the metal grid unit 22 in the first direction divides the pixel unit 21 into a plurality of pixel regions with different areas, so that a plurality of non-uniform sub-pixel units will be formed. The plurality of non-uniform sub-pixel units can emit light with different spatial frequencies. The light with different spatial frequencies interferes after passing through the metal grid unit 22, and interference fringes are not easily formed in a specific range of sight distance.

As shown in FIG. 3, in some embodiments, the antenna layer 13 includes a first line group and a second line group. The first line group includes a plurality of mutually parallel first metal lines 23, and the second line group includes a plurality of mutually parallel second metal line 24. The first metal lines 23 and the second metal lines 24 cross each other to form the metal grid unit 22. The first metal lines 23 and the second metal lines 24 are not perpendicular to each other. The first metal lines 23 and the second metal lines 24 are not parallel and not perpendicular to the edge lines of the pixel unit 21.

For example, the display layer 11 may include red pixel units, green pixel units and blue pixel units. The red pixel units, the green pixel units and the blue pixel units are all rectangular and have the same size. The red pixel units, the green pixel units and the blue pixel units are arranged in horizontal rows and vertical columns. The plurality of first metal lines 23 in the first line group are parallel to each other and have the same spacing between each other, and the plurality of second metal lines 24 in the second line group are parallel to each other and have the same spacing between each other. The spacing between adjacent first metal lines 23 is the same as the spacing between adjacent second metal lines 24. The first metal lines 23 and the second metal lines 24 are not perpendicular to each other. The first metal lines 23 and the second metal lines 24 are neither perpendicular to any side of the rectangular pixel unit 21 nor parallel to any side of the rectangular pixel unit 21.

In this way, a rhombus-shaped metal grid unit 22 can be formed. The projection of the rhombus-shaped metal grid unit 22 along the first direction can divide the pixel unit 21 into pixel areas with different areas. Each pixel area can emit light with different spatial frequencies respectively to avoid the formation of interference fringes in a specific viewing distance range.

Figure 4:
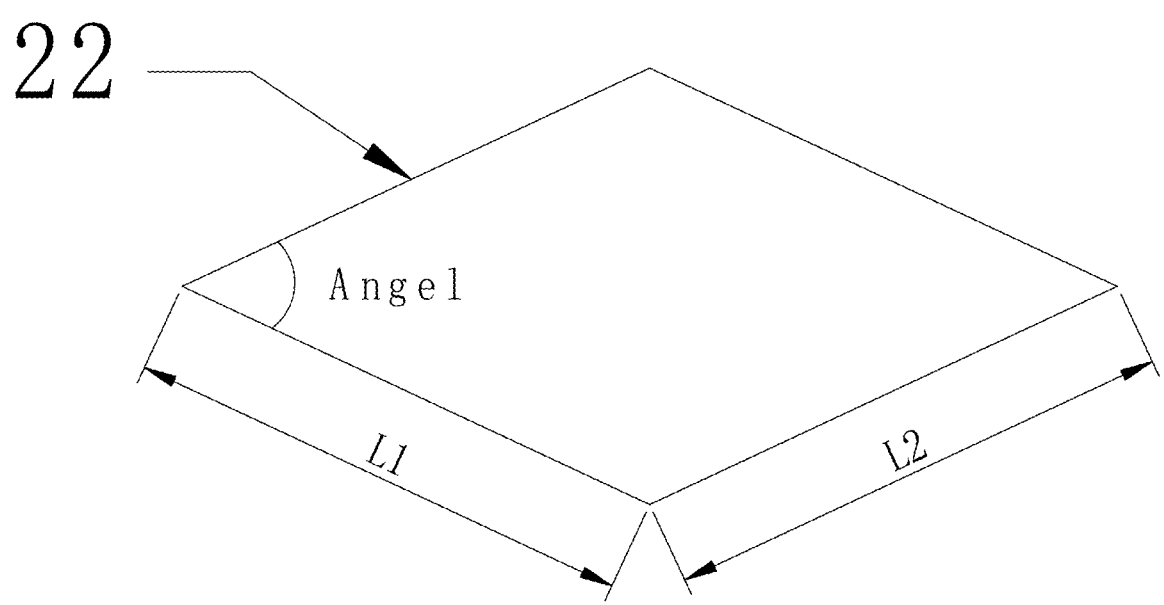
FIG. 4 illustrates a schematic structural diagram of a metal mesh/grid unit according to an embodiment of the present disclosure.

As shown in FIG. 4, in an optional embodiment, the first angle between the first metal line 23 and the second metal line 24 is in the range of about 20° to about 75°. In an example where the pixel unit 21s are rectangular shape with the same size and the pixel units 21 are arranged in horizontal rows and vertical columns. The angle between the first metal line 23 and one side of the rectangular pixel unit 21 can be the same as the angle between the second metal line 24 and the same side of the rectangular pixel unit 21, and the first angle between the first metal line 23 and the second metal line 24 is between about 20° and about 75°, then the angle between the first metal line 23 and one side (a first side) of the rectangular pixel unit 21 and the angle between the second metal line 24 and the same side of the rectangular pixel unit 21 are between about 10° and about 37.5°, and the angle between the first metal line 23 and another side (a second side) of the rectangular pixel unit 21 and the angle between the second metal line 24 and the another side of the rectangular pixel unit 21 are between about 52.7° and about 80°.

Referring to FIG. 4, in an optional embodiment, the distance L1 between adjacent first metal lines 23 and the distance L2 between adjacent second metal lines 24 are both in the range of about 200 μm to about 400 It should be noted that the distance L1 between the adjacent first metal lines 23 herein refers to the length of the line segment of the second metal line 24 located between the two adjacent first metal lines 23. Similarly, the distance L2 between the adjacent second metal lines 24 refers to the length of the line segment of the first metal line 23 located between the two adjacent second metal lines 24. Optionally, the distance between adjacent first metal lines 23 and the distance between adjacent second metal lines 24 may be equal, and the distance between adjacent first metal lines 23 may be, for example, about 200 about 250 about 300 about 350 about 400 etc.

In an optional embodiment, the smaller the line width of the first metal line 23 and the second metal line 24 is, the smaller the interference to the light emitted by the pixel unit 21 is. On this basis, the line widths of the first metal lines 23 and the second metal lines 24 can both be less than about 5 μm. Taking the rectangular pixel unit 21 as an example, the size of the pixel unit 21 may be, for example, about 25 μm×about 75 μm, and the spacing between adjacent pixel units 21 is, for example, about 20 μm to about 60 μm. The angle between adjacent first metal lines 23 and second metal lines 24 may be, for example, about 50°, the distance between adjacent first metal lines 23 and the distance between adjacent second metal lines 24 may be, for example, about 200 μm, and the line widths of the first metal lines 23 and the second metal lines 24 can be, for example, about 4 μm.

It can be understood that the above-mentioned ranges of various angles, distances/spacings, and line widths are only exemplary. In a specific implementation, it suffices that the projection of the metal grid unit 22 in the first direction can divide the pixel units 21 into pixel regions/areas with different areas, and each pixel area can respectively form light with different spatial frequencies.

Figure 5:
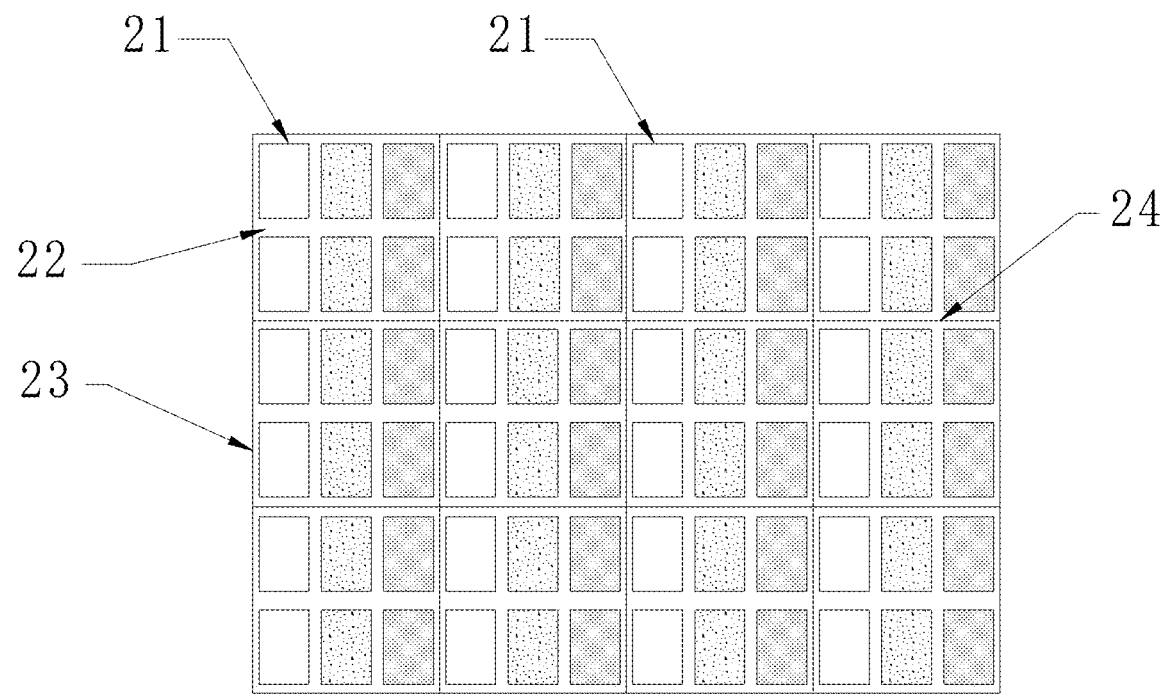
FIG. 5 illustrates a schematic partial structure diagram of a display panel according to another embodiment of the present disclosure.

As shown in FIG. 5, in some embodiments, the metal grid unit 22 is formed by metal lines arranged along the gaps between the pixel units 21. That is, the metal grid unit 22 and the pixel units 21 may not overlap, so that the metal grid unit 22 does not obstruct the pixel units 21 and does not affect the display effect of the display panel. As such, the antenna unit 30 can be formed on the display panel without be visible to human eyes. In an optional embodiment, the pixel units 21 may still be rectangles with the same size, and the pixel units 21 may be arranged in horizontal rows and vertical columns. The antenna layer 13 may include the first metal lines 23 arranged along the gaps between adjacent columns and the second metal lines 24 arranged along the gaps between adjacent rows. The first metal lines 23 and the second metal lines 24 can all be straight lines. In specific implementations, metal lines may be arranged in the gaps between each adjacent pixels, or one metal line may be arranged at intervals of one or more pixel units 21. For example, in the horizontal direction, one first metal line 23 may be provided every three pixel units 21, and in the vertical direction, one second metal line 24 may be provided in each interval between the pixel units 21.

Figure 6A:
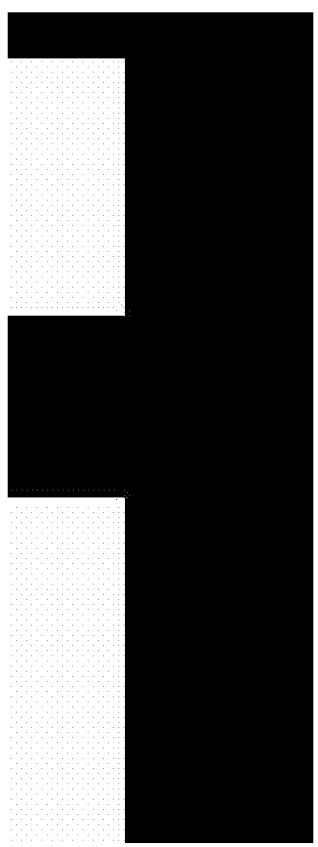
FIG. 6A illustrates a schematic structural diagram of a target antenna unit according to an embodiment of the present disclosure.
Figure 6B:
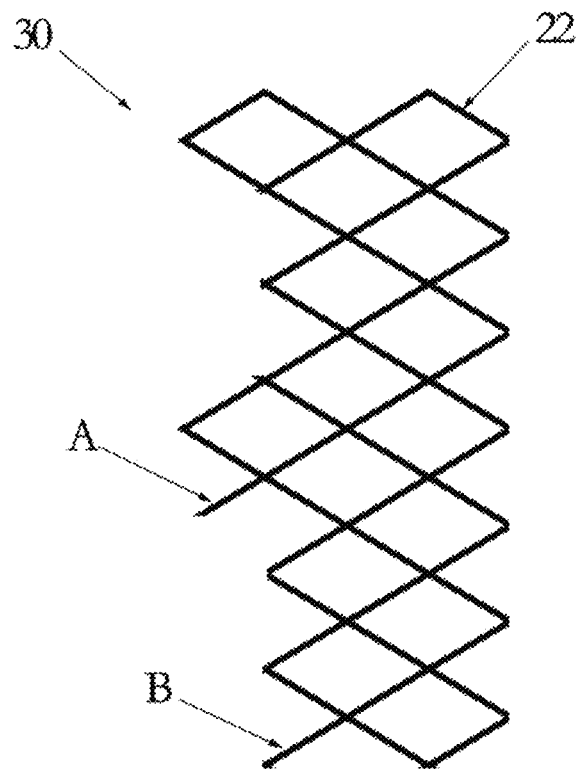
FIG. 6B illustrates a schematic structural diagram of an equivalent antenna unit corresponding to the target antenna unit of FIG. 6A according to an embodiment of the present disclosure.

In the specific implementation, it is necessary to use the metal grid unit 22 to equivalently obtain a radiator with a characteristic shape. For example, FIG. 6A illustrates a target antenna unit 30 to be designed. If a first area 133 is formed according to the shape of the target antenna unit 30 and the target antenna unit 30 is equivalent through the metal grid unit 22 in the first area 133, then the formed first area 133 is shown in FIG. 6B. The first area 133 includes multiple non-closed metal grid units 22. These non-closed metal grid units 22 will form open-circuited metal lines, and the open-circuited metal lines will form signal radiation at non-operating frequency points when performing signal radiation.

Figure 6C:
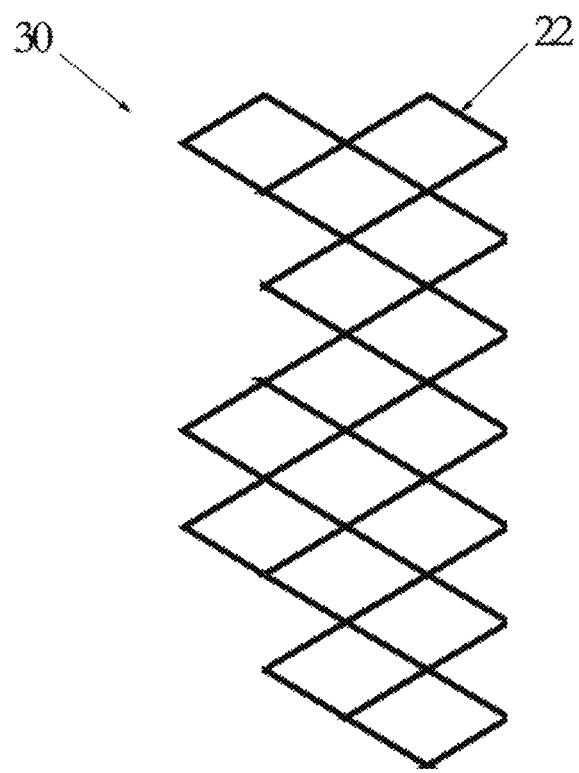
FIG. 6C illustrates a schematic structural diagram of another equivalent antenna unit corresponding to the target antenna unit of FIG. 6A according to an embodiment of the present disclosure.

In order to prevent the formation of signal radiation at non-operating frequency points, each metal grid unit 22 in the first region 133 may be configured as a closed grid unit. Still taking the target antenna unit 30 shown in FIG. 6A as an example, a first area 133 can be formed by dividing the target antenna unit 30 according to the method shown in FIG. 6C. The target antenna unit 30 can then be equivalent through the metal grid units 22 in the first area 133. In this way, each metal grid unit 22 in the first area 133 is a closed grid unit, which can effectively prevent the open-circuited metal wires from forming signal radiation at non-operating frequency points. For example, in the example of forming the metal mesh units 22 by crossing the first metal lines 23 and the second metal lines 24, in order to avoid the formation of the non-closed metal grid units 22 in the first area 133, it can be configured as follows: both ends of the first metal line 23 in the first area 133 intersect with the second metal line 24, and both ends of the second metal line 24 in the first area 133 intersect with the first metal line 23. In this way, neither the first metal lines 23 nor the second metal lines 24 in the first area 133 form open-circuited metal lines.

As shown in FIG. 7A, in general, the antenna unit 30 may include a radiating body 31, a first feeding part 32 and a second feeding part 33 connected to the radiating body 31. The end portions of the first feeding part 32 and the first feeding part 33 respectively form a feeding point. However, forming the antenna unit 30 through the metal grid units 22 will lead to deterioration of the isolation of the antenna unit 30, and the first feeding part 32 and the second feeding part 33 will form a coupling currents in opposite directions, affecting the performance of the antenna.

In order to prevent the first feeding part 32 and the second feeding part 33 from forming a coupling current, in some embodiments, the antenna unit 30 can be configured to include a radiating body 31, a first feeding part 32 and a second feeding part 33 connected to the radiating body 31, and a reverse conduction circuit 34 connecting the first feeding part 32 with the second feeding part 33. The reverse conduction circuit 34 is formed by connecting the metal grid units 22 that are conductive with each other. The coupling circuits on the first feeding part 32 and the second feeding part 33 in opposite directions can be neutralized through the reverse conduction circuit 34, which is beneficial to improve the performance of the antenna unit 30.

Figure 7B:
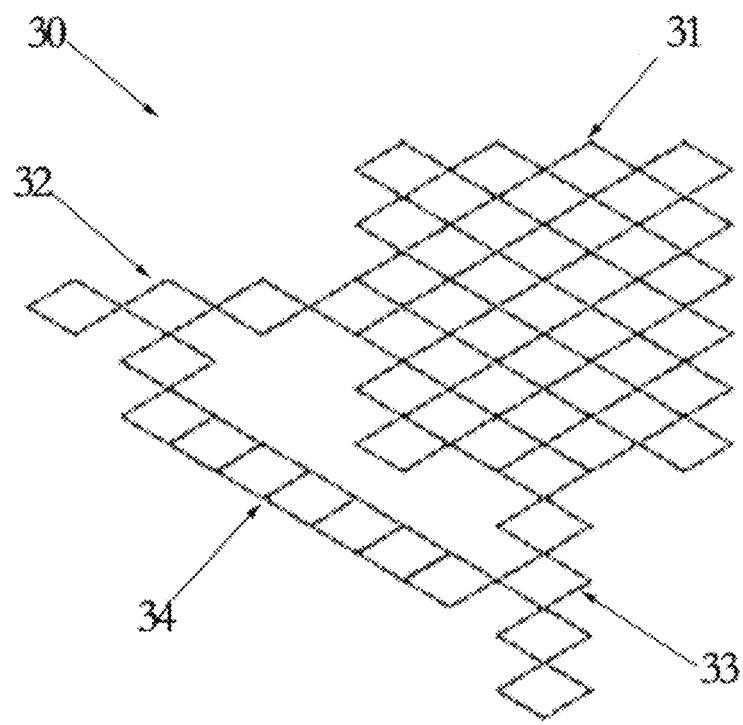
FIG. 7B illustrates a schematic structural diagram of another antenna unit according to an embodiment of the present disclosure.

As shown in FIG. 7B, a rectangular radiating body 31 can be formed by the metal grid units 22. The first feeding part 32 and the second feeding part 33 can be formed by a plurality of metal grid units 22 connected in sequence. A reverse conduction circuit 34 is formed between the first feeding part 32 and the second feeding part 33 through the connection of the metal mesh units 22.

Figure 8A:
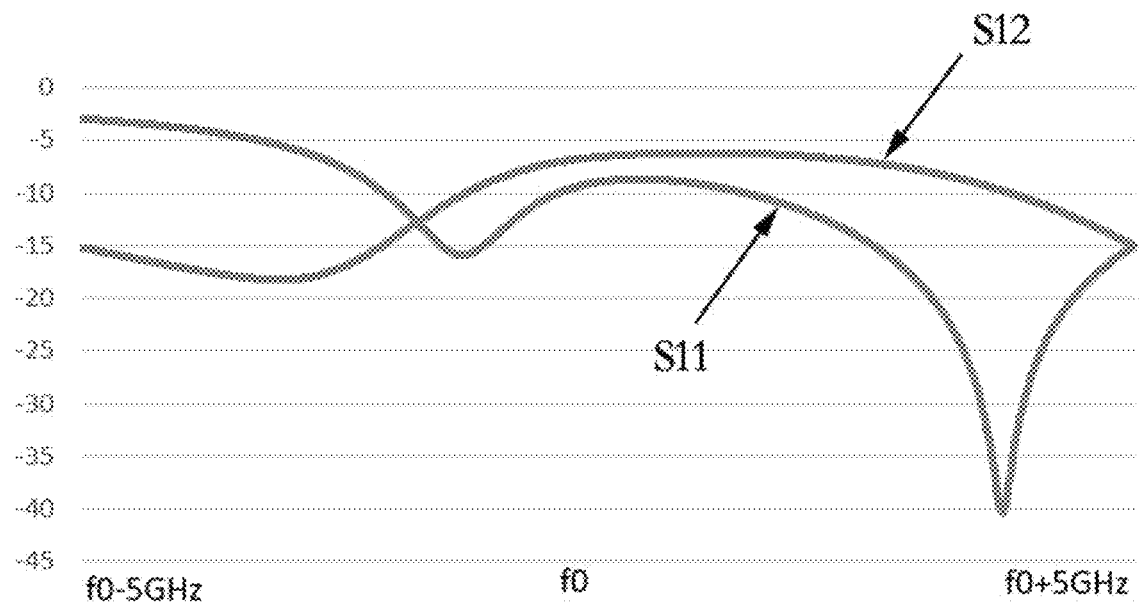
FIG. 8A illustrates a graph of a simulation result for the antenna unit in FIG. 7A according to an embodiment of the present disclosure.
Figure 8B:
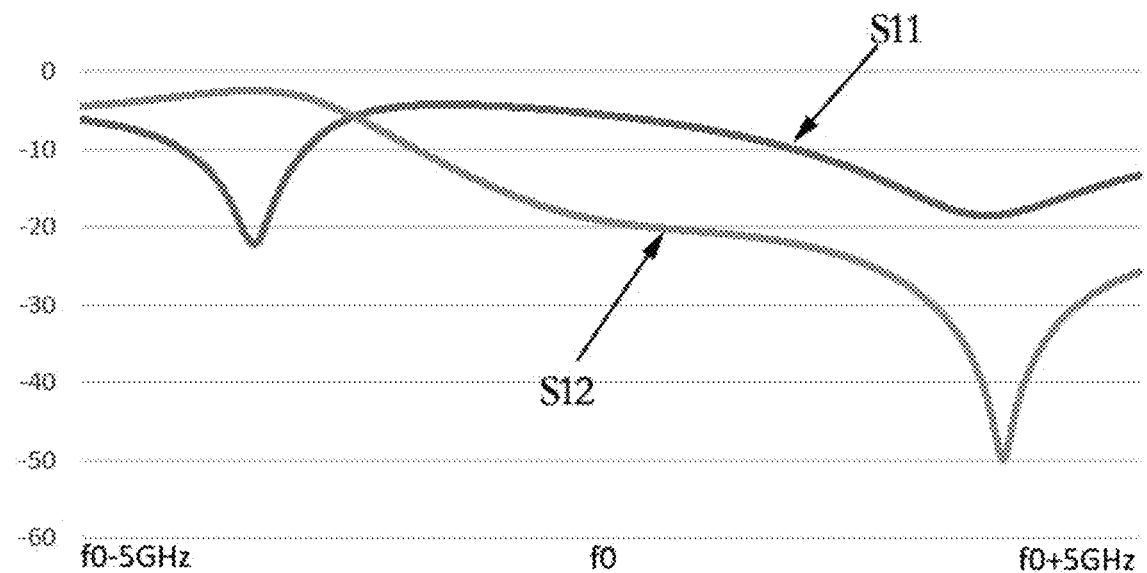
FIG. 8B illustrates a graph of a simulation result for the antenna unit of FIG. 7B according to an embodiment of the present disclosure.

FIG. 8A is a graph showing the simulation result of the antenna unit 30 shown in FIG. 7A. FIG. 8B is a graph showing the simulation result of the antenna unit 30 shown in FIG. 7B. The S12 curves in FIGS. 8A and 8B are the reverse transmission coefficient curves. It can be clearly seen that the value of the S12 curve at the point f0 in FIG. 8B is significantly lower than the value of the S12 curve at the point f0 in FIG. 8A. Therefore, by setting the reverse conduction circuit 34, influence of the coupling current in the opposite directions on the performance of the antenna unit 30 can be significantly reduced, which is beneficial to improve the performance of the antenna unit 30.

Referring to FIG. 2, in some embodiments, the antenna unit 30 may be located near the periphery of the antenna layer 13. In this way, the lengths of the first feeding part 32 and the second feeding part 33 of the antenna unit 30 are short, which can shorten the signal transmission distance and reduce the signal loss to improve the performance of the antenna unit 30. For example, when the entire antenna layer 13 is in the shape of a rectangle, a plurality of different types of antenna units 30 can be arranged near each side of the rectangle. As shown in FIG. 2, RX antenna units 30 and TX antenna units 30 are arranged at the upper left corner of the antenna layer 13, 5G mmwave H-pol antenna units 30 are arranged at the upper right corner of the antenna layer 13, the MIMO antenna units 30 are respectively provided at the left edge and the right edge of the antenna layer 13, and the WIFI antenna units 30 are provided at the lower edge of the antenna layer 13.

The display panel of the embodiments of the present disclosure can make the metal grid units 22 invisible to the human eye within a specific viewing distance range, and ensure that the display effect of the display panel is consistent. The display panel disclosed herein can also form a transparent antenna without basically affecting the display effect. The display panel disclosed herein can also avoid occupying the internal space of the body of an electronic device, which is conducive to the realization of lightweight and thin electronic devices. The display panel disclosed herein can further avoid the influence of the metal casing on the antenna, and also reduce the design and processing difficulty for the casing of an electronic device.

The above embodiments are only exemplary embodiments of the present disclosure, and are not intended to limit the present disclosure. The protection scope of the present disclosure is defined by the claims. Those skilled in the art can make various modifications or equivalent replacements to the present disclosure within the spirit and protection scope of the present disclosure, and such modifications or equivalent replacements should also be regarded as falling within the protection scope of the present disclosure.

What is claimed is:
1. A display panel comprising:
a display layer; and
an antenna layer; and
a light polarizing layer provided on a side of the antenna layer facing away from the display layer, the light polarizing layer configured for polarizing light emitted from the display layer;
wherein:
the display layer includes pixel units arranged according to a first rule,
the antenna layer is arranged on a light-exiting side of the display layer,
the antenna layer includes a plurality of metal grid units formed by metal lines, and the plurality of metal grid units evenly arranged in the antenna layer according to a second rule,
the antenna layer includes a first area and a second area, metal grid units in the first area are in conduction with each other, and are not in conduction to metal grid units in the second area, whereby forming antenna units,
each of the metal grid units in the first area is a closed grid unit, and all ends of metal lines forming the metal grid units in the first area are not free ends,
the second area is a non-antenna area, and
a ratio of a total area of the first area and the second area over an area of the display layer is greater than 90%.
2. The display panel of claim 1, wherein:
the antenna layer has an area same as the area of the display layer, and the antenna layer has an overall shape same as an overall shape of the display layer; or
the area of the antenna layer is smaller than the area of the display layer, and the antenna layer is stacked over a middle area of the display layer.

3. The display panel of claim 1, wherein:
the metal grid units overlap the pixel units,
a projection of the metal grid units in a first direction divides the pixel units into a plurality of pixel areas, the plurality of pixel areas having different areas, and
the first direction is a direction perpendicular to a plane where the display layer is located.

4. The display panel of claim 3, wherein:
the metal lines of the antenna layer include a first line group and a second line group, the first line group including a plurality of mutually parallel first metal lines, and the second line group including a plurality of mutually parallel second metal lines,
the first metal lines and the second metal lines intersect with each other to form the metal grid units,
the first metal lines and the second metal lines are not mutually perpendicular, and
the first metal lines and the second metal lines are neither parallel nor perpendicular to edge lines of the pixel units.

5. The display panel of claim 4, wherein:
angles between the first metal lines and the second metal lines are in a range of about 20° to about 75°,
a distance between adjacent first metal lines and a distance between adjacent second metal lines are both in a range of about 200 μm to about 400 μm, and/or
line widths of the first metal lines and the second metal lines are less than about 5 μm.

6. The display panel of claim 4, wherein:
in the first area, both ends of the first metal lines intersect with the second metal lines, and
in the first area, both ends of the second metal lines intersect with the first metal lines.

7. The display panel of claim 1, wherein the metal grid units are formed of the metal lines arranged along gaps between the pixel units.

8. The display panel of claim 1, wherein:
each of the antenna units includes a radiating body, and a first feeding part and a second feeding part connected to the radiating body,
the first feeding part and the second feeding part are connected through a reverse conduction circuit, and
the reverse conduction circuit is formed by connecting the metal grid units that are conductive with each other.

9. The display panel of claim 1, wherein:
the antenna layer includes a transparent carrier layer, and the metal grid units are disposed on the transparent carrier layer; and/or
the antenna units are located close to a perimeter of the antenna layer.

10. The display panel of claim 9, wherein the transparent carrier layer is formed of a material including polyethylene terephthalate (PET) film, COP film, or polyimide (CPI) film.

11. The display panel of claim 1, further comprising:
an adhesive layer; and
a protective layer, wherein the proactive layer is adhered to a side of the light polarizing layer facing away from the antenna layer through the adhesive layer.

12. The display panel of claim 11, wherein the protective layer includes a glass cover plate.

13. The display panel of claim 1, wherein the pixel units include red pixel units, green pixel units and blue pixel units arranged according to the first rule.

14. The display panel of claim 13, wherein the red pixel units, the green pixel units and the blue pixel units have a same shape and a same size.

15. The display panel of claim 1, where the metal grid units are formed of a material including copper, aluminum, or silver.

16. The display panel of claim 1, wherein:
each of the antenna units includes a radiating body, and a first feeding part and a second feeding part connected to the radiating body,
the first feeding part includes:
a first end connected to the radiating body, and
a second end opposite to the first end and distal to the radiating body,
the second feeding part includes:
a third end connected to the radiating body, and
a fourth end opposite to the third end and distal to the radiating body,
the second end of the first feeding part is connected to the fourth end of the second feeding part through a reverse conduction circuit, the reverse conduction circuit being formed by a part of the metal lines of the antenna layer.

17. A display panel comprising:
a display layer; and
an antenna layer; and
a light polarizing layer provided on a side of the antenna layer facing away from the display layer, the light polarizing layer configured for polarizing light emitted from the display layer;
wherein:
the display layer includes pixel units arranged according to a first rule,
the antenna layer is arranged on a light-exiting side of the display layer,
the antenna layer includes a plurality of metal grid units formed by metal lines, and the plurality of metal grid units evenly arranged in the antenna layer according to a second rule,
the antenna layer includes a first area and a second area,
metal grid units in the first area are in conduction with each other, and are not in conduction to metal grid units in the second area, whereby forming antenna units,
the second area is a non-antenna area, and
a ratio of a total area of the first area and the second area over an area of the display layer is greater than 90%.

* * * * *